Dec. 6, 1966  J. J. BRAUTOVICH  3,290,104
STORAGE AND RETRIEVAL APPARATUS
Filed Feb. 15, 1965  7 Sheets-Sheet 1

INVENTOR.
JOHN J. BRAUTOVICH
BY
ATTORNEY

Dec. 6, 1966     J. J. BRAUTOVICH     3,290,104
STORAGE AND RETRIEVAL APPARATUS
Filed Feb. 15, 1965     7 Sheets-Sheet 2

INVENTOR.
JOHN J. BRAUTOVICH
BY
ATTORNEY

Fig. 8

INVENTOR.
JOHN J. BRAUTOVICH
ATTORNEY

Dec. 6, 1966  J. J. BRAUTOVICH  3,290,104
STORAGE AND RETRIEVAL APPARATUS
Filed Feb. 15, 1965  7 Sheets-Sheet 6

INVENTOR.
JOHN J. BRAUTOVICH
BY
ATTORNEY

Dec. 6, 1966 J. J. BRAUTOVICH 3,290,104
STORAGE AND RETRIEVAL APPARATUS
Filed Feb. 15, 1965 7 Sheets-Sheet 7

INVENTOR.
JOHN J. BRAUTOVICH
BY
ATTORNEY

United States Patent Office 3,290,104
Patented Dec. 6, 1966

3,290,104
STORAGE AND RETRIEVAL APPARATUS
John J. Brautovich, Monta Vista, Calif., assignor to Powerfile, Mountain View, Calif., a corporation of California
Filed Feb. 15, 1965, Ser. No. 432,731
6 Claims. (Cl. 312—194)

This invention relates to storage and retrieval apparatus, and particularly to such apparatus adapted to be integrated with one or more office desks to provide an efficient work unit.

Modern office procedures involve ever increasing amounts of paper work and filing. There is clearly a very substantial need for an improved arrangement for storing and retrieving files. In most cases it is present office practice to employ only manually operated file containers and to arrange such file containers at locations which require office personnel to leave their desks in order to place material in or obtain material from the containers.

Accordingly, it is an object of the present invention to provide improved storage and retrieval apparatus which forms an integrated unit with a desk wherein the desk functions in the usual manner and in addition a substantial volume of files can be stored and retrieved automatically by personnel sitting at the desk.

More specifically an object of the invention is to provide automatic storage and retrieval apparatus which is smaller for a given amount of storage than prior designs. In addition to the usual benefits brought about by compact construction, the construction according to the invention makes it possible to integrate a conventional size desk with storage and retrieval apparatus which will accommodate conventional size files and yet not extend above the height of the desk top.

Another and related object of the invention is to provide automatic storage and retrieval apparatus in which the storage boxes travel primarily in a horizontal line whereby the apparatus can be made to have a horizontally extending cabinet having a work surface substantially at conventional desk top height.

An additional object of the invention is to provide automatic storage and retrieval apparatus which is integrated with and supplies the support pedestal for one end of a desk top. A related object of the invention is to provide such an integrated arrangement wherein the storage and retrieval apparatus is large enough to provide a support pedestal for a plurality of spaced desk tops and wherein a storage and retrieval station is accessible to an operator seated at each of said desks.

A further object of the invention is to provide storage and retrieval apparatus of the type having storage boxes attached to a continuous path conveyor wherein improved means are provided for holding the storage boxes upright throughout their travel around the continuous path.

An additional object of the invention is to provide storage and retrieval apparatus having improved control means for automatically bringing any selected filing box to a filing and removal station.

Another object of the invention is to provide an improved selector switch for causing a desired amount of motion of a movable mechanism.

Other and further objects and features of advantage will become apparent from the following detailed description wherein reference is made to the accompanying drawings, in which:

FIGURE 3 is a top view on enlarged scale of the storage and retrieval apparatus of FIGS. 1 and 2, with the top of the cabinet removed, and with the storage boxes removed from the right hand portion of the apparatus;

FIGURE 4 is a side view showing in detail the means for supporting the storage boxes on the continuous chains. FIG. 4 is taken on line 4—4 of FIG. 3 but with the side of the cabinet removed;

FIGURE 5 is cross sectional view on enlarged scale taken on line 5—5 of FIG. 4;

Referring in more detail to the drawings, FIG. 1-7 show one embodiment comprising storage and retrieval apparatus 1 and a desk 2. The desk comprises a single support pedestal 3 which may be closed to provide drawers 4 or other type of storage, or the support pedestal can be in the form of a narrow panel or conventional legs. The desk has a top 5 which is supported at one end of the pedestal 3. The other end of the desk top is supported by the storage and retrieval apparatus 1.

Figure 1:
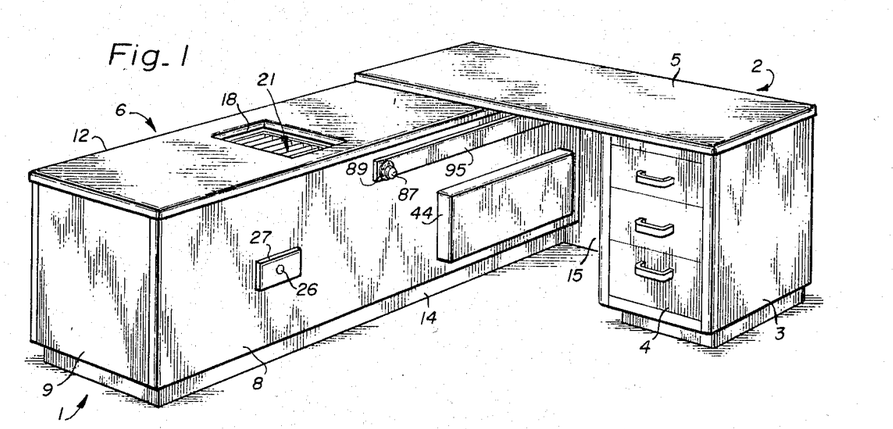
FIGURE 1 is a perspective view of one embodiment of storage and retrieval apparatus according to the invention integrated with a single desk.

The storage and retrieval apparatus comprises a cabinet 6 having side walls 8–11 and a top 12. The cabinet has a bottom 13 which is preferably supported on a base 14 to match the design of the pedestal 3. The end of the desk top 5 opposite pedestal 3 is supported on the cabinet for the storage and retrieval apparatus. In one preferred embodiment, the desk top 5 is supported by resting directly on top of the cabinet top 12. If desired the desk may be provided with a front panel 15.

It will be seen from FIG. 1 that a very compact and efficient integrated work unit is provided. More specifically, the space required to house the desired storage-capacity in the apparatus 1 is provided in such a way that the top 12 of cabinet 6 provides a work surface at appropriate height for a person seated at desk 2. In addition the cabinet 6 provides a support for one end of the desk top 5. The cabinet top 12 is provided with an opening 18 which forms a filing and removal station, as will be hereinafter described in more detail. The work surface provided by the cabinet 6 can be used for a variety of office functions. For example, a typewriter (not shown) can be located on the cabinet between the opening 18 and the adjacent surface of the desk top 5 and preferably supported on a conventional pull out board.

In order to provide storage and retrieval apparatus which will accommodate a large volume of conventional size files and still fit in a cabinet which forms the desired integrated unit with a desk, a special construction is required for the internal mechanism of the storage and retrieval apparatus. Such internal mechanism will now be described, with particular reference to FIGS. 2–7.

The storage and retrieval apparatus comprises a plurality of holder members for material to be stored and retrieved. In the specific embodiment of FIGS. 2–7, the holder members are in the form of storage boxes 20. The storage boxes 20 are preferably simple open top containers and can be made of any appropriate material such as wood, metal or plastic. The storage boxes 20 are of a size to receive conventional size files and preferably the boxes are shaped so that the width of the boxes will accommodate the length of the files referred to as a group at 21 in FIGS. 1 and 2. By virtue of this arrangement the headings on the files can be read easily by a person seated at the integrated desk and storage and retrieval apparatus.

Each of the boxes 20 is mounted in a special way on a pair of specially arranged continuous chains 22 and 23. The term chain is used throughout the specification and claims in the broad sense of a continuous length of material which can be driven around a closed path. In the preferred form shown in the drawings, the chain comprises pivotally interconnected metal links of conventional form. The chains are mounted in cabinet 6 and are driven by a conventional reversible electric motor 24 in the following manner. Chain 22 is connected at one end to a sprocket wheel 25 which is mounted on a stub shaft 26 journalled in the side wall 8. Side wall 8 is reinforced by a journal plate 27. The other end of chain 22 is connected to a driving sprocket 28 connected to a shaft 29 for rotation therewith. Shaft 29 is journalled in the cabinet wall 8 and in a reinforcing journal plate 30. A sprocket wheel 31 is connected to the outside end of the shaft 29 for rotation with the shaft so that when wheel 31 is driven it causes the drive sprocket 28 to rotate. Wheel 31 is driven by a conventional metal link chain 32. In addition to engaging sprocket 31, chain 32 is passed around a sprocket wheel 33 and under a sprocket wheel 34. Chain 32 is driven by a sprocket 35 connected to the drive shaft of a conventional gear unit 36 which is in turn driven by the motor 24.

The purpose of sprocket wheel 33 is to provide an arrangement whereby chain 23 will be driven in unison with chain 22. Accordingly, sprocket 33 is drivingly attached to one end of a shaft 38 which is journalled in the side 8, reinforcing plate 30, side 10 and a reinforcing plate 39. A drive sprocket 40 for the chain 23 is attached to shaft 38 for rotation therewith. One end of chain 23 passes around the sprocket 40 and the other end passes around a sprocket wheel 41 which is mounted on a stub shaft 42. Shaft 42 is journalled in wall 10 and in a reinforcing plate 43. Thus it will now be clear that chains 22 and 23 are positively driven in unison by the drive sprockets 28 and 40, respectively. The sprockets 31, 33, 34 and 35 and chain 32 are shielded with a cover plate 44 as shown in FIG. 1.

The special means for mounting the storage boxes 20 on the chains 22 and 23 will now be described. In general the mounting comprises a cantilever attachment means 50 connecting the boxes to chain 22 and a similar cantilever attachment means 51 connecting the boxes to chain 23. The cantilever nature of the attachment is important because it is only by this means that the storage boxes 20 can be so closely spaced as shown; that is, in almost touching side-by-side relation. If the storage boxes were connected directly to the chains and were closely spaced as shown they would crowd into each other in attempting to go around the turns at the ends of the chains.

Each of the cantilever attachment means 50 comprises a first or main arm 52 and an auxiliary or second arm 53.

The arms 52 and 53 are each connected at one end to chain 22 at spaced positons therealong. The other end of arm 53 is pivotally connected to the outer portion of arm 52. These pivotal connections are shown best in FIGS. 4 and 5.

The connections between chain 22 and arms 52 and 53 are the same and therefore only one, the latter, is shown in section. In the preferred form of the invention the chains 22 and 23 are made of conventional overlapping metal links 54 interconnected by pivot pins. The links 54 on opposite sides of the chain are held apart by short spacing cylinders 55 which rotatably surround the pivot pins through the ends of the links. In order to connect each arm to the chain two of the regular short pivot pins are each replaced by a long pivot pin 56. A guide disk 57 is placed on one side of the chain and a guide disk 58 is placed on the other side of the chain. The two long pins 56 for the two arms are swaged over washers 59 to hold disks 57 in place and are swaged over washers 60 to hold in place a cover ring 61 and disks 58. The associated cantilever arm is thus clamped between the ring 61 and the disk 58.

Figures 3, 4, 5:
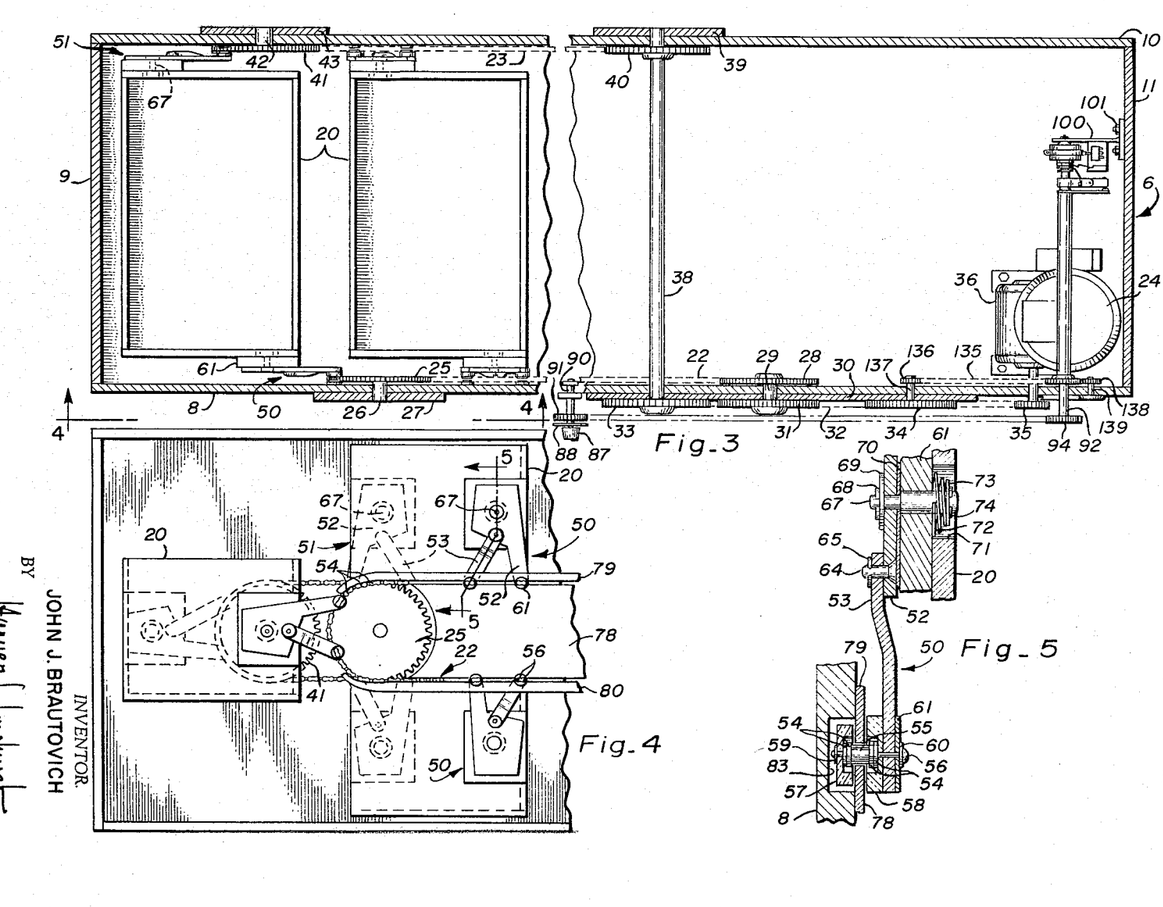

The connection between cantilever arm 52 and cantilever arm 53 is formed by a pivot pin 64. The head of pin 64 is countersunk in arm 52, and the pin is held in place by a snap ring 65 on the outer end of the pin. The connection between cantilever arm 52 and the side of the box 20 it supports is formed by a pivot pin 67. As shown in FIG. 5, the left end of pivot pin 67 receives a snap ring 68 against a washer 69. A large diameter bearing washer 70 is located between the face of arm 52 and the face of a wood spacer block 61. Spacer block 61 is attached to the side of storage box 20 in any conventional manner, for example, by screws which are not visible in the drawings, or by glue. As shown in FIG. 5, the side of box 20 is bored at 71 to receive a compression coil spring 72. The left end of spring 72 abuts the block 61, and the right end of the spring abuts a washer 73 which is held in place by a snap ring 74. The effect of the described construction is to hold box 20 snugly against arm 52 and yet freely pivotable so the box 20 can remain upright even though the arm 52 changes from pointing upward on the upper reach of chain 22 to pointing downward on the lower reach of chain 22.

The cantilever connection between chain 22 and the adjacent side of one box 20 has now been described. The cantilever connection 50 to chain 22 is identical for each of the storage boxes 20. The cantilever connections 51 between each of the storage boxes and the chain 23 are identical to the cantilever connections 50 except for orientation. The cantilever arms 52 and 53 of the cantilever means 51 are turned through 180° from those of cantilever means 50 when viewed from the top of the storage and retrieval apparatus 1. Of course, if the cantilever attachment means 50 and 51 are viewed separately from their respective side of the storage and retrieval apparatus, they can be considered substantially identical even in the aspect of orientation. It is, however, very important for one feature of the invention that the pivot pin 67 for the cantilever attachment means 50 be offset from the pivot pin 67 for the cantilever attachment means 51 on the opposite side of the same box.

The reason why it is important to offset the location of the pivot pins 67 on opposite sides of each box is that such arrangement provides a positive requirement that the storage boxes 20 remain upright throughout their travel around the continuous path formed by chains 22 and 23. If the pivot pins 67 on opposite sides of the storage boxes were coaxial, the storage boxes would be free to rock back and forth and bang into each other as they moved around the continuous path of travel. If the pivot pins 67 were coaxial it would be necessary to provide some type of complicated guide tracks to maintain the storage boxes in a steady upright position. The steadying result is achieved very simply by the invention through the use of the offset arrangement of the pivot pins 67.

In order to offset the pivot pins 67 and still achieve a working arrangement, it is necessary that the axes of the sprocket wheels of the chains 22 and 23 be offset in the same amount and in the same direction as the pivot pins 67 on opposite sides of each of the storage boxes 20 are offset. More specifically, sprocket wheel 41 of chain 23 is spaced to the left of sprocket wheel 25 of chain 22 the same amount that pivot pin 67 of cantilever means 51 is spaced to the left of pivot pin 67 of the cantilever means 50 as viewed in the drawings. Similarly sprocket wheel 40 of chain 23 is spaced to the left of sprocket wheel 28 of chain 22 the same amount that pivot pin 67 of cantilever means 51 is spaced to the left of pivot pin 67 of the cantilever means 50.

Another feature of the invention involves the means for supporting the horizontal reaches of the chains 22 and 23 intermediate the sprocket wheels 25, 29 and 40, 41. It should be noted at this point that if the long reaches of the chains were vertical instead of horizontal there would not be any need to support the chains intermediate their end sprocket wheels, but such vertical arrangement would not permit the cabinet 6 to be low enough to be integrated with a desk in the manner shown and described herein. The chain-supporting problem caused by the horizontal arrangement of the chains is simply and effectively solved by having the chains run in contact with a center supporting and guiding member 78 and upper and lower supporting and guiding members 79 and 80. The supporting and guiding members 78–80 are duplicated on both sides of the cabinet 6. All of the members 78–80 are attached to the wall 8 on one side of the cabinet and to the wall 10 on the other side of the cabinet. The attachment can be made in any convenient manner such as by gluing or using screws.

Although the main purpose of the support and guide members 78–80 is to support the elongated reaches of the chains against the forces of gravity, the members 79 and 80 are placed so close to the center member that the slots between the center member 78 and the top and bottom members 79 and 80 are close enough to prevent any appreciable movement of the chains up or down to prevent any vibratory motion. The chain-receiving slots between member 78 and members 79 and 80 are of course wide enough to prevent binding of the chains. It will be realized that the spacing and bearing cylinders 55 are the portions of the chains which actually contact the edges of the guide members 78–80, and as such, provide built-in bearings for the motion between the chains and the support and guide members 78–80. The chains are also held against unwanted lateral horizontal movement by the guide disks 57 and 58 which connect the cantilever arms 52 and 53 to the chains. The guide disks 57 and 58 also serve the related function of maintaining the bearing cylinders 55 in the slots between members 78 and members 79 and 80. The side walls 8 and 10 are recessed at 83 to accommodate the guide disks 57, and the guide members 78–80 overlap recess 83 as shown in FIG. 5.

Figure 2:
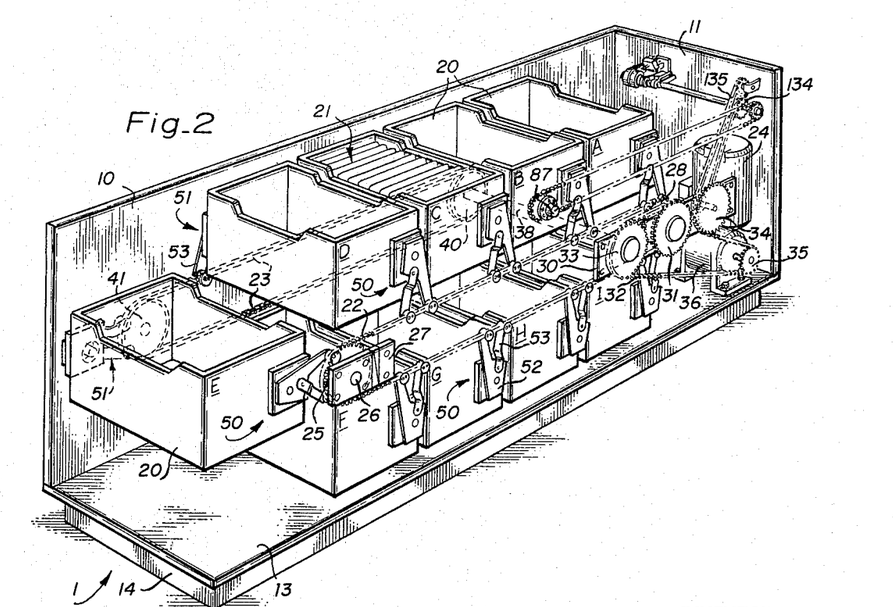
FIGURE 2 is a perspective view on enlarged scale showing the storage and retrieval apparatus of FIG. 1 with the near walls removed to show the internal mechanism.

The means for driving the chains 22 and 23 and the means for connecting the storage boxes 20 thereto have now been described, and next will be described the control switch means for causing a desired one of the storage boxes to move to and stop beneath the filing and removal opening 18. As shown best in FIGS. 6 and 7, the control switch means is indicated generally at 86 and comprises a control knob 87 having a pointer mark 88 thereon. The mark 88 cooperates with a dial ring 89. The control knob 87 is mounted on a shaft 90 for rotation therewith. Shaft 90 is journalled in conventional manner in side 8 of the cabinet 6. A sprocket wheel 91 is mounted on shaft 90 for rotation therewith for the purpose of driving a physically removed switch shaft 92. The drive connection between sprocket 91 and the displaced shaft 92 is by means of a conventional link chain 93 and a sprocket 94 mounted on shaft 92 for rotation therewith. Chain 93 is shielded by a cover 95 on which it is convenient to mount the dial ring 89 in stationary manner. Thus, when the control knob 87 is turned, the pointer mark moves around the dial ring 89 so that the pointer can be set to any one of the nine marks on the dial ring. For example, the dial can be marked off with letters A–I, corresponding to designations A–I for the storage boxes 20 as shown in FIG. 2.

The switch shaft 92 is journalled at one end in the wall 8 of cabinet 6 and is journalled at the other end in a bracket 100 mounted on the end wall 11 of the cabinet 6 by means of bolts 101. A switch actuator 102 is attached to shaft 92 at a position spaced from the side wall 8. The switch actuator comprises an inner portion 103 which is yoke-shaped to provide two spaced outwardly extending arms 104. The inner portion 103 is rigidly attached to shaft 92 for rotation therewith, as by welding. The switch actuator also comprises an outer portion 105 having an open rectangular shape formed by two side walls 106, an inner end wall 107, and an outer end wall 108. The yoke arms 104 and the side walls 106 are all drilled on a common axis and pivot pins 109 and 110 are inserted through the drilled holes and held in place by cotter pins 111. Thus it will be seen that the outer actuator portion 105 is pivotally supported on the inner portion 103.

A switch actuating arm 114 is welded at one end to the inner end wall 107 on pivoted portion 105 of the switch actuator. The other end of arm 114 operates a thrust collar 115 which is mounted on shaft 92 for sliding movement therealong. More specifically, the free end of arm 114 is received in a circumferential groove 116 in the thrust collar. The thrust collar has an adjacent circumferential groove 117 which receives the free end of the switch arm 118 of a conventional on-off switch 119. Switch 119 is rigidly mounted on a platform 120. Platform 120 is welded to the bracket 100, and switch 119 is secured to the platform by screws 121.

Figure 6:
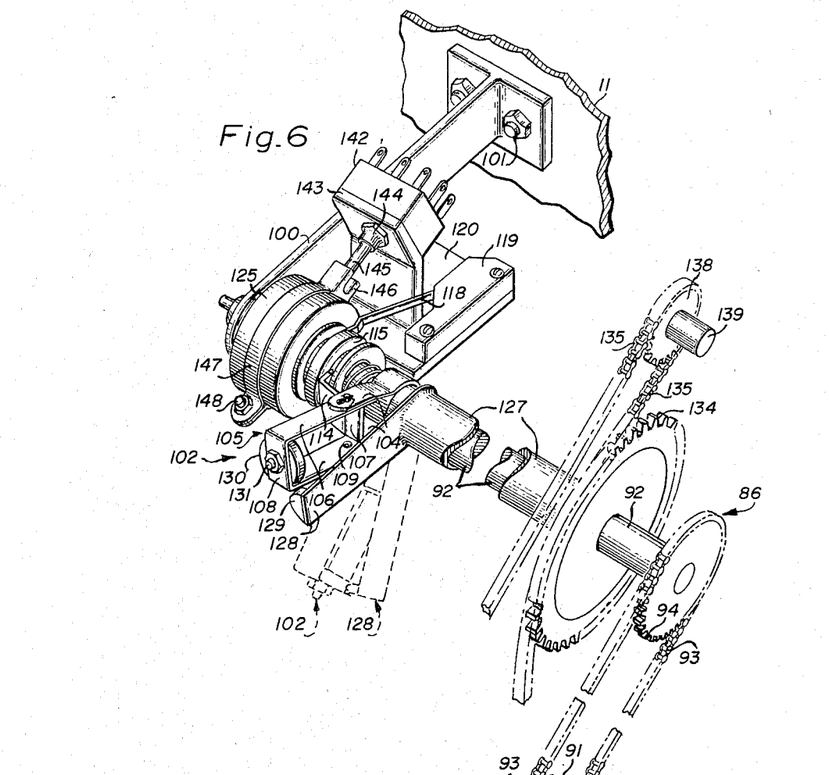
FIGURE 6 is a perspective view of the control switch mechanism for bringing the desired storage box to the storage and retrieval station. An example of a different setting for the switch is shown in dash lines.

The operation of the on-off switch 119 is as follows. The thrust collar 115 is normally biased by a coil spring 124 in a direction which places the on-off switch 119 in the closed position in accordance with the conventional construction of the switch. More specifically spring 124 pushes the thrust collar 115 to the left as viewed in FIG. 6. Such movement of the collar will, of course, require similar movement of the actuating arm 114. The arm 118 is biased to the left in FIG. 6 in accordance with the inherent operation of the conventional switch 119 of which it is a part. In other words, switch 119 is in the closed position as long as arm 118 is free to move to the position shown in FIG. 6. When switch 119 is in the closed position it causes motor 24 to rotate. The limit of movement of collar 115 to the left is caused by abutment of the collar against a clutch sleeve 125. Sleeve 125 is held against movement along shaft 92, as by abutment with the bracket 100. Thus, when the thrust collar is moved by spring 124 into abutment with sleeve 125, the switch arm 118 is free to move to its closed position for switch 119, all as shown in FIG. 6. However, if the switch actuator portion 105 is pivoted to the left as viewed in FIG. 6, the actuating arm 114 will pull the thrust collar 115 back against spring 124. Such movement of the collar will force the switch arm 118 to the right in FIG. 6 and will thus place switch 119 in its open position.

Accordingly, switch 119 remains in the closed position until the actuator portion 105 is pivoted against the force of spring 124. The means for moving the actuator portion against the spring 124 will now be described. A cylindrical shaft 127 is rotatably mounted on shaft 92. As viewed in FIG. 6, the left end of shaft 127 carries cam means rotatable therewith. The cam means comprises a radial arm 128 welded to the end of shaft 127 and having a cam lip 129 welded to its outer end. The purpose of cam lip 129 is to force the actuator portion 105 about the pivots 109 and 110. In order to implement this purpose, the outer end of portion 105 carries a bearing wheel 130. Wheel 130 is rotatably attached to the outer end wall 108 by means of a pivot screw 131. Thus when the cam arm 128 is moved to be in parallel alignment with the switch actuator 102, the cam lip 129 engages wheel 130 and forces the portion 105 to pivot against the force of spring 124 to the position shown in FIG. 7. In the position shown in FIG. 7, the thrust collar has forced the switch arm 118 far enough toward switch 119 to place the switch in its open position.

The way in which the movement of the cam arm 128 is controlled will now be described. A sprocket wheel 134 is securely attached, as by welding, to the end of shaft 127 remote from the arm 129. Sprocket wheel 134 is driven by a conventional link chain 135 which causes sprocket 134 to turn at the same rate and in the same direction as chains 22 and 23. In other words, when a given point on chain 22 and a given point on chain 23 makes one complete trip around the closed path of travel of its chain, the sprocket 134 will simultaneously make one rotation. In order to drive the sprocket wheel 134 at the same rate and in the same direction as chains 22 and 23, the chain 135 is driven by a small diameter sprocket 136, shown best in FIG. 3. The sprocket 136 is attached to a shaft 137 which is journalled in wall 8 and is driven by the sprocket 34. The upper end of chain 135 is supported by a sprocket wheel 138 on a shaft 139 journalled in wall 8. The lower reach of chain 135 drivingly engages the upper surface of sprocket wheel 134 in order to cause the cam arm 128 to turn in the same direction as the chains 22 and 23.

In addition to the on-off switch 119, the complete switch mechanism includes a conventional reversing switch 142. The reversing switch is mounted on a support member 143 by means of the usual nut 144. The lower end of support member 143 is welded to the platform 120. Switch 142 has an operating arm 145 projecting through the support 143 and nut 144. The outer end of arm 145 is movable in conventional manner between lower and upper positions corresponding to forward and reverse operation of motor 24. More specifically, when arm 145 is down, and switch 119 is in the closed position, motor 24 will operate in the direction to move chains 22 and 23 clockwise as viewed in the drawing. Conversely, when arm 145 is up, and switch 119 is in the closed position, motor 24 will operate in the reverse direction to move chains 22 and 23 counterclockwise. The switch arm 145 is moved to its upper and lower positions, selectively, by the clutch sleeve 125. Sleeve 125 is preferably made of a plastic material with a bore of a size which provides a close friction fit around the shaft 92 so that rotation of shaft 92 will cause sleeve 125 to rotate therewith, but when rotation of sleeve 125 is resisted with sufficient strength, shaft 92 can rotate relative to the clutch sleeve. The motion of sleeve 125 is transmitted to the switch arm 145 by a yoke 146 secured to the clutch sleeve by a clamping band 147 held in place by a screw 148.

Thus, when dial 87 is turned to move pointer 88 from one mark on dial 89 at least as far as the next adjacent mark, shaft 92 will move clutch sleeve 125 at least as far as is required to move switch arm 145 from one position to its opposite position. Any additional movement of shaft 92 will result in the shaft turning relative to the clutch sleeve while the sleeve is firmly held against further rotation by means of the inherent limits of travel for arm 145 which are an integral part of the conventional switch mechanism 142. In describing the initial turning motion of sleeve 125 to reverse the position of arm 145, it was of course assumed that the knob 87 was turned in the direction opposite from the direction in which it was previously last turned. For example, if knob 87 was previously turned clockwise and is then turned counterclockwise the switch arm 145 will be moved from its lower position to its upper position. However, if knob 87 was previously turned clockwise and is again turned clockwise, the switch arm 145 will simply remain in its lower position.

The complete operation of the on-off and reversing switch mechanism will now be described. It will be understood that the switches 119 and 142 are integrated into the electrical wiring for the motor 24. Such wiring is shown schematically in FIG. 7 and involves wires 150 connecting switches 119 and 142 to a terminal box 151 for the motor 24. Power is supplied to the system through a cable 152 and conventional plug 153. In FIGS. 1, 2, 3 and 7, the apparatus is shown with the storage box C positioned beneath the operating station 18 and the switch mechanism set in the position which has caused box C to be delivered to the operating station. More specifically, knob 87 has been turned counterclockwise from some other position to a position in which line 88 points to mark C on the dial 89. As a result, the switch actuator 102 was moved by shaft 92 to a position corresponding to the circumferential orientation of mark C on dial 89. As soon as the actuator portion 105 was moved from under cam 129, switch 119 was freed to move to its closed position to start motor 24. The motor turned in the direction to move the boxes 20 counterclockwise because the knob 87 was turned counterclockwise. Had the knob been turned clockwise, the motor would have driven the boxes clockwise. The cam arm 128 will have travelled at the same rate and in the same direction as boxes 20 until it reached parallel alignment with the switch actuator 102 and cam 129 abuts wheel 130. The result of this action is to pivot the actuator portion 105 around pins 109 and 110 to move the thrust collar 115 against the force of spring 124. The described movement depresses switch arm 118 to place switch 119 in its off position. The various chains and sprocket teeth are so arranged that when the cam arm 128 reaches the position C setting of the switch actuator 102, the box C will be at the operating station 18, where it will remain because switch 119 is then turned off.

FIG. 6 shows a couple of other operational positions for the switch mechanism. For example, if it were desired to change from box C at the operating station and present box F at the station, knob 87 would be turned clockwise until line 88 pointed to mark F. Such movement of the control knob will move the actuator 102 to the F position shown in dashed outline. Movement of the actuator 102 will start the motor 24 which will cause box F to move clockwise. The cam arm 128 will simultaneously move clockwise, and is shown in dotted outline just as it is about to contact the actuator 102 and thus stop box F at the operating station.

If it is desired to replace box F with box H at the operating station 18, the knob 87 would be turned clockwise until line 88 points to mark H. Such movement of the control knob will move the actuator 102 to the H position shown in solid lines in FIG. 6. Movement of the actuator 102 will again start motor 24 which will cause box H to move clockwise. The cam arm 128 will again simultaneously move clockwise, and is shown in solid lines just as it is about to contact the actuator 102 and thus stop box H at the operating station.

In each of the adjustments described in connection with FIG. 6, the control knob was moved clockwise because that was the direction in which the desired new mark on dial 89 was closest. As a result of the clockwise movement of the control knob, the reversing switch arm 145 is turned to or held in its down position so that the motor turns in the direction which will drive the boxes clockwise. When it is desired to move from a mark on dial 89 to another mark which is closer in the counterclockwise direction, knob 87 is simply turned counterclockwise. This arrangement saves considerable amount of time over the situation where the boxes must always be driven in the same direction. For example, if box F is desired at the operating station and box H is already there it is not necessary to wait for the numerous intervening boxes to travel clockwise to place box F in position. Instead it is simply necessary to move counterclockwise so that only one box, G, has to move under the operating station before box F reaches the station. In terms of FIG. 6, the desired change would be accomplished by moving the switch actuator 102 counterclockwise from its H position shown in solid lines to its F position shown in dotted lines. The initial counterclockwise movement of shaft 92 would turn the clutch sleeve 125 to move the switch arm 145 to its upper position which will drive the boxes 20 and the cam arm 128 counterclockwise. As in the case of clockwise action, the motor will be stopped when the cam arm 128 becomes parallel with the switch actuator 102. FIGS. 1–7 show an embodiment of the invention in which the storage boxes 20 are driven by two parallel chains, with each chain being elongated along a substantially horizontal line and operating in a substantially vertical plane. FIGS. 8–11 show an embodiment of the invention in which the storage boxes are driven by a single chain which is also elongated along a substantially horizontal line but operates in a substantially horizontal plane. Basically, the difference between the embodiment of FIGS. 1–7 and the embodiment of FIGS. 8–11 is that in the former the storage boxes travel in an over and under path while in the latter the boxes travel in a side-by-side path.

In more detail the embodiment of FIGS. 8–11 comprises storage and retrieval apparatus 160 and a pair of conventional desks 161 and 162. Each of the desks comprises two support pedestals 163 and 164 which are spaced apart to provide the usual kneehole. Each of the desks has a top 165 supported on the pedestals 163 and 164.

Figure 8:
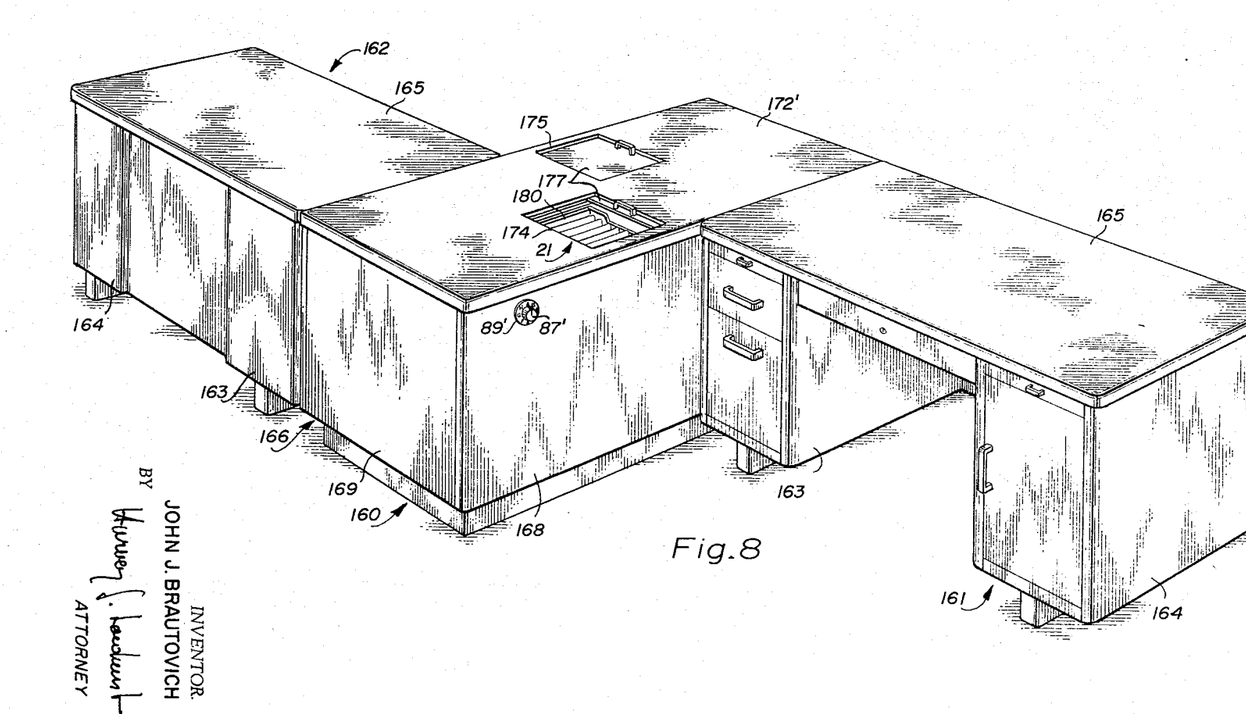
FIGURE 8 is a perspective view of a second embodiment of storage and retrieval apparatus according to the invention and integrated with a plurality of desks.
Figure 9:
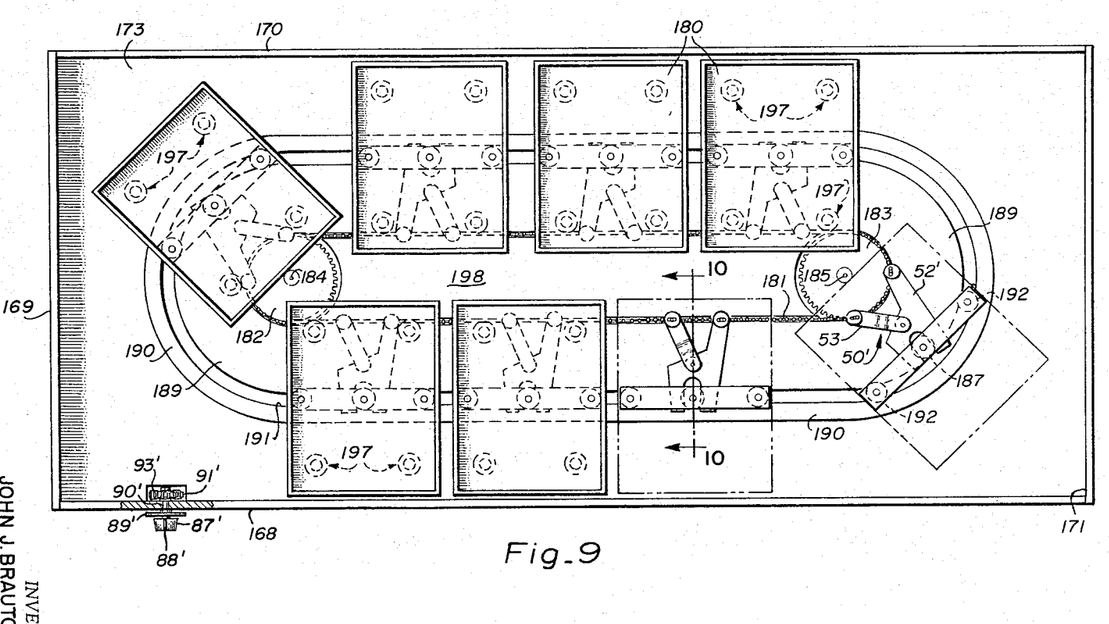
FIGURE 9 is a top view on enlarged scale showing the storage and retrieval apparatus of FIG. 8 with the top of the cabinet removed to show the internal mechanism.
Figure 10:
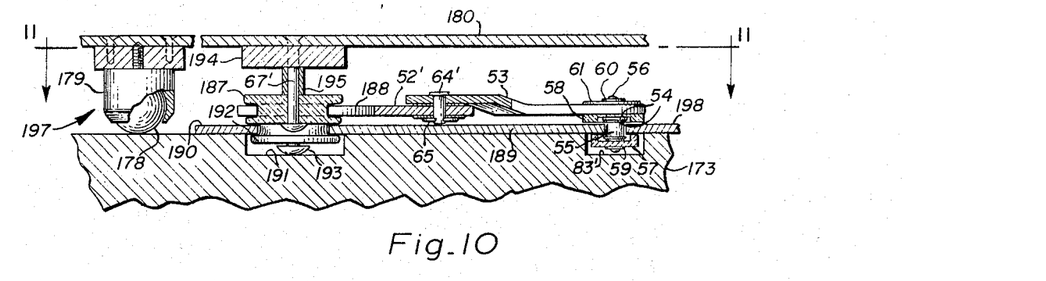
FIGURE 10 is a cross sectional view on enlarged scale taken on the line 10—10 of FIG. 9 and showing in detail the means for connecting the storage boxes to the continuous chain.
Figure 11:
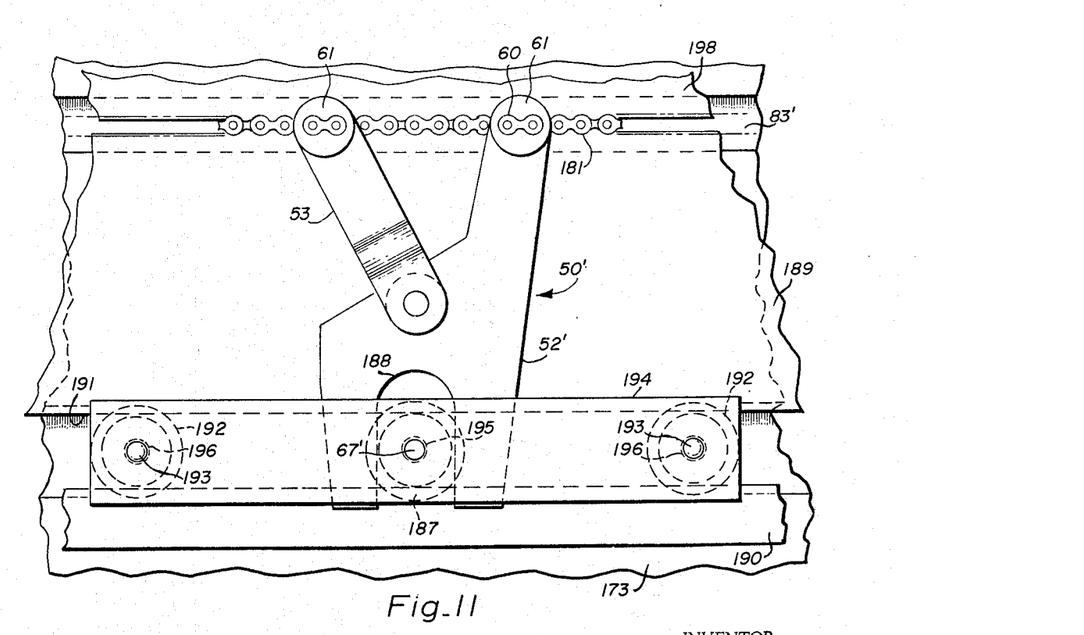
FIGURE 11 is a plan view taken on the line 11—11 of FIG. 10.

The storage and retrieval apparatus 160 comprises a cabinet 166 having side walls 168–171 and a top 172. A horizontal supporting platform 173 is secured inside the cabinet 166 as shown in FIGS. 9–11. In contrast to the embodiment of FIG. 1, the cabinet of FIG. 8 is designed so that the top 172 of the cabinet is the same height as the tops 165 of the conventional desks. In addition, the cabinet top 172 is provided with two openings 174 and 175, each preferably provided with a sliding cover 177. Thus, the embodiment of FIG. 8 provides an arrangement in which two conventional desks can be placed beside the storage and retrieval apparatus 160 to provide an integrated three-piece unit which conserves space and is efficient to use. It should be noted that since the cabinet top 172 is the same height as the desk tops 165, a large area of continuous work surface is provided.

In order to provide storage and retrieval apparatus which will accommodate a large volume of conventional size files usable from two desk positions and still fit in a cabinet which forms the desired integrated unit with two desks a special construction is required for the internal mechanism of the storage and retrieval apparatus. Such internal mechanism will now be described, with particular reference to FIGS. 9–11.

The storage and retrieval apparatus 160 comprises a plurality of storage boxes 180 which can be substantially the same as boxes 20. More specifically, the boxes 180 are preferably open top containers made from any appropriate material such as wood, metal or plastic. Also, the storage boxes 180 are of a size to receive conventional size files, and preferably the boxes are shaped so that the width of the boxes will accommodate the length of the files referred to as a group at 21 in FIG. 8. The files have been removed from the boxes in FIG. 9 to clarify the showing of the operating mechanism. However, it will be obvious from a comparison of FIGS. 8 and 9 that the files 21 will be in the same reading order at station 174 for a person at desk 161 as they are at station 175 for a person at desk 162.

Each of the boxes 180 is mounted in a special way on a continuous chain 181 as shown in FIGS. 9–11. As in the case of chains 22 and 23, the preferred form of chain 181 comprises pivotally interconnected metal links of conventional form. The chain 181 is mounted on two end sprocket wheels 182 and 183. The sprocket wheels 182 and 183 are mounted on shafts 184 and 185, respectively, and the shafts are journalled in the support platform 173. A conventional electric motor (not shown) is positioned below platform 173 and is drivingly connected to shaft 185 to drive the sprocket wheel 183. For example, a driving arrangement similar to the driving arrangement for chain 22 can be employed.

The special means for mounting the storage boxes 180 on the chain 181 will now be described. As in the case of the mounting for boxes 20, the mounting for boxes 180 involves a cantilever attachment means. The use of the cantilever type attachment for boxes 180 is for the same purpose as it is for boxes 20; namely, to permit the use of closely spaced boxes. If boxes 180 had a direct, instead of the cantilever type, attachment to chain 181, they would crowd into each other as they attempted to go around the turns at sprockets 182 and 183, and the apparatus simply would not work.

Since the attachment means for boxes 180 are so closely related to the attachment means for the boxes 20, the same reference numerals will be used for identical parts, and primed reference numerals will be used for similar parts. Thus, each of the boxes 180 is attached to chain 181 by a cantilever attachment means 50′. Since only one chain is involved in the embodiment of FIG. 8, only one cantilever means is employed for each box and is positioned beneath the box. Each of the attachment means 50′ comprises a first or main arm 52′ and an auxiliary or second arm 53. The arms 52′ and 53 are each connected to chain 181 at spaced positions therealong. The other end of arm 52′ is pivotally connected to its respective box, and the other end of arm 53 is pivotally connected to the outer portion of arm 52′.

One difference between the attachment means for boxes 20 and boxes 180 is that boxes 180 are required to have a slight sliding movement with respect to arm 52′, as well as the pivotal movement involved in the case of boxes 20. The connection details for boxes 180 are shown best in FIGS. 9–11. As in the case of chains 22 and 23, chain 181 is preferably made of conventional overlapping metal links 54 interconnected by pivot pins. The links 54 on opposite sides of the chain are held apart by short spacing cylinders 55 which rotatably surround the pivot pins through the ends of the links. In order to connect each arm to the chain, two of the regular short pivot pins are each replaced by a long pivot pin 56. A guide disk 57 is placed on one side of the chain 181, and a guide disk 58 is placed on the other side of the chain. The two long pins 56 for each of the two arms are swaged over washers 59 to hold disks 57 in place and are swaged over elongated washers 60 to hold in place a cover ring 61 and disks 58. The associated cantilever arm is thus held between the ring 61 and the disk 58.

The connection between cantilever arm 52′ and cantilever arm 53 is formed by a pivot pin 64′. The head of pin 64′ engages arm 53, and the pin is held in place by a snap ring 65 on the lower end of the pin. The connection between the cantilever arm 52′ and the bottom of the box 180 it supports is formed by a pivot pin 67′. One end of pin 67′ is countersunk in the bottom of box 180, and the head at the other end of the pin engages a follower wheel 187 which is rotatably received on the pin 67′. The cantilever arm 52′ is provided with a slot 188, and the periphery of the follower wheel 187 is provided with an annular groove which receives and rolls along the edges of the walls which form slot 188. Since boxes 180 are not held in continuously proper orientation to the chain 181 by means of having two offset pivotal connections to two chains as in the case of boxes 20, the boxes 180 must be guided as they move around their continuous path of travel.

The guide means for the boxes 180 comprise an inner supporting and guiding plate 189 and an outer supporting and guiding plate 190. Both of the plates are secured to the upper surface of the platform 173 by any appropriate conventional means such as nails, screws or glue. The platform 173 is provided with an elongated oval groove 191 under the adjacent edges of the guide plates 189 and 190. A pair of guide wheels 192 for each box 180 are received in the groove 191. The periphery of each wheel 192 is provided with an annular groove which receives the adjacent edges of plates 189 and 190. Each of the wheels 192 is connected to the box 180 by a pivot pin 193. A reinforcing bar 194 is attached to the bottom of each box 180, and the pivot pins 67' and 193 extend through the bar. A spacing sleeve 195 is located around pin 67' and similar sleeves 196 are located around pins 193. In order to hold boxes 180 spaced above the cantilever driving means, a conventional ball roller unit 197 is placed adjacent each corner of each box. Each roller unit comprises a ball 178 held for rotation in a collar 179 which is attached to the bottom of the box. The travel of the boxes is guided by the end wheels 192, and the actual drive for the boxes is provided by the center wheels 187. When the boxes go around the end curves, the necessary movement of wheel 187 relative to its adjacent end wheels 192 is accommodated by the slot 188.

As in the embodiment of FIG. 1, the embodiment of FIG. 8 involves means for guiding and supporting the horizontal reaches of chain 180 between the sprocket wheels 182 and 183. More specifically, a center guide plate 198 is attached to the platform 173 to cooperate with the inner edge of plate 189. The platform 173 is provided with an oval groove 83' under the adjacent edges of guide plates 189 and 198. The guide disks 57 are received in groove 83' and abut the under surfaces of plates 189 and 198 to prevent chain 181 from bouncing upward. The disks 58 slide along the upper surfaces of plates 189 and 198 to prevent chain 181 from sagging under the force of gravity. Lateral motion of the chain is prevented by engagement between the bearing cylinders 55 and the adjacent edges of plates 189 and 198.

Figure 7:
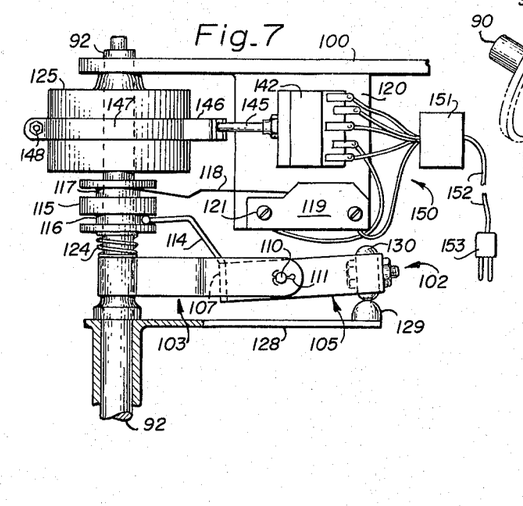
FIGURE 7 is a top view of a portion of the control switch mechanism of FIG. 6, but showing parts of the mechanism in different operational positions.

In order to move individual boxes 180 selectively under the filing and removal stations 174 and 175, each side of the cabinet 166 is provided with a control knob 87' and a dial 89'. Each of the knobs 87' is mounted on a shaft 90' journalled in the side wall and carrying a sprocket wheel 91'. The sprocket wheel 91' drives a chain 93' which is connected to a switch mechanism such as shown in FIGS. 6 and 7. Since the switch mechanism is basically the same for the embodiment of FIG. 8 and for the embodiment of FIG. 1, the details are not repeated for FIG. 8. However, it should be understood that since the switch mechanism of FIG. 8 is operated by two control knobs to bring selected boxes to two different stations, the pointer line 88' and dial 89' on the near side of the cabinet in FIG. 8 are arranged to control the switch mechanism to bring the selected box 180 to the opening 174, whereas the pointer line and dial on the far side of the cabinet are arranged to control the switch mechanism to bring the selected box 180 to the opening 175.

Figure 12:
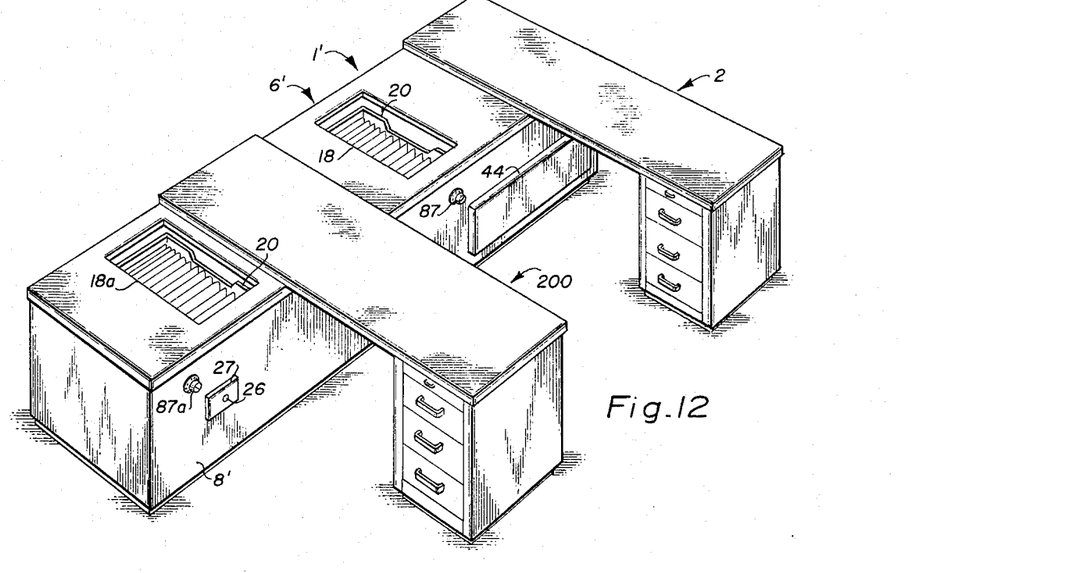
FIGURE 12 is a perspective view of storage and retrieval apparatus similar to FIG. 1 but integrated with a plurality of desks.
Figure 13:
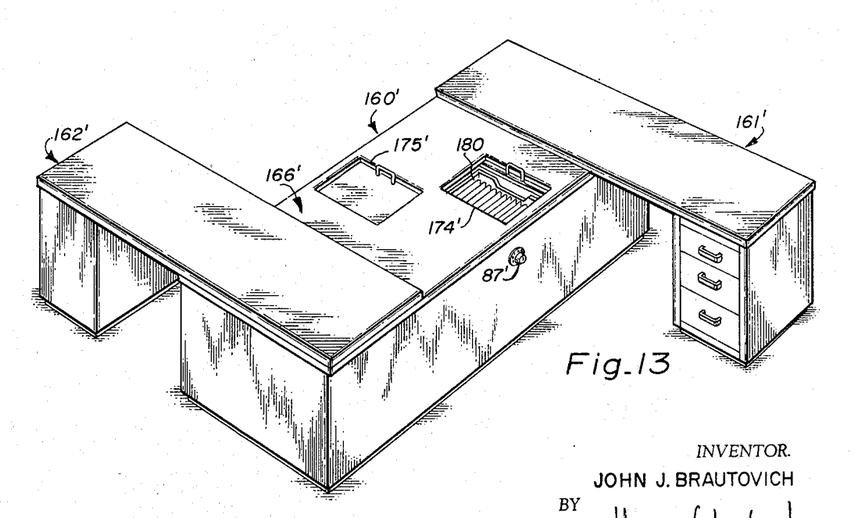
FIGURE 13 is a perspective view of storage and retrieval apparatus similar to FIG. 8 but integrated with desks having only one pedestal.

FIGS. 12 and 13 show two further embodiments of the invention which further demonstrate the versatility of the basic design concepts. FIG. 12 shows an arrangement in which the storage and retrieval apparatus 1' is similar to the apparatus of FIG. 1 in employing a pair of parallel chains similar to the chains 22 and 23 to provide an over-and-under path of travel for storage boxes 20. The main difference between the storage and retrieval apparatus 1 and the storage and retrieval apparatus 1' is that the latter is made longer to accommodate a second desk 200 which is preferably similar to desk 2. Thus the shaft 26 for the rear sprocket wheel is substantially further from the front of the cabinet 6', and the top 12' is substantially longer than the top 12 of FIG. 1. Also, the side 8' is provided with a second control knob 87a which controls the switch mechanism, such as shown in FIGS. 6 and 7, to deliver selected ones of the boxes 20 to an opening 18a for desk 200.

FIG. 13 shows an arrangement in which the storage and retrieval apparatus 160' is similar to the apparatus of FIG. 8 in employing a single chain such as chain 181 to provide a side-by-side path of travel for storage boxes 180. However, the cabinet 166' for the storage and retrieval apparatus 160' is shorter in height than the cabinet 166 in order to support the tops of desks 161' and 162' at conventional desk top height. In addition, the cabinet 166' is longer than cabinet 166 to accommodate the overlapping positions of desks 161' and 162'. Also the positions of the filling and removal stations 174' and 175' are modified to accommodate the overlapping positions of desks 161' and 162'.

Although specific details of the present invention are shown and described herein, it is to be understood that modifications may be made therein without departing from the spirit and scope of the invention as set forth in the appended claims.

I claim:

1. A storage and retrieval apparatus of substantially L-shaped configuration including at least one desk of standard desk height and a work-containing cabinet including a top, said desk comprising perpendicular support means at one end thereof, a top extending horizontally therefrom and having its opposite free end associated with the top of the work-containing cabinet, the overall height of the latter not exceeding the height of the desk top, at least one of holder members adapted to travel through a fixed path in said cabinet, the latter having a depth to accommodate standard width office files extending in a vertical plane and complemental to their path of travel through the cabinet so as to be stored and retrieved therefrom, means defining at least one opening in said cabinet top dimensioned to allow removal and return thereto of the vertically positioned files and means for automatically moving said holder means under the opening in a horizontal line of travel.

2. A storage and retrieval apparatus as claimed in claim 1, wherein the top of the work-containing cabinet extends beneath the top of the desk.

3. A storage and retrieval apparatus as claimed in claim 1, wherein said means for moving said holder members comprise two horizontally elongated continuous chains in spaced vertical planes, and means for connecting each of said holder members to both of said chains.

4. A storage and retrieval apparatus as claimed in claim 1, wherein said desk has a kneehole opening, and said cabinet extends under said desk on one side of said kneehole opening and forms a support for said desk top.

5. A storage and retrieval apparatus as claimed in claim 1, wherein said means for moving said holder members moves said containers under a portion of said desk top.

6. A storage and retrieval apparatus as claimed in claim 1, wherein said plurality of holder members are correlated to travel in side-by-side relation beneath the means defining the opening in said cabinet top thereby adapting the storage and retrieval apparatus to use by more than one operator.

References Cited by the Examiner

UNITED STATES PATENTS

| | | | |
|---|---|---|---|
| 1,582,573 | 4/1926 | Caldwell | 312—198 |
| 1,938,985 | 12/1933 | Starr | 312—134 X |
| 2,285,110 | 6/1942 | Clerc | 312—134 |
| 2,673,779 | 3/1954 | Stewart | 312—223 |
| 2,729,531 | 1/1956 | Andersen | 312—268 |
| 2,755,155 | 7/1956 | Luss | 312—301 |

(Other references on following page)

UNITED STATES PATENTS

| | | | |
|---|---|---|---|
| 2,758,901 | 7/1956 | Cole | 312—223 |
| 2,813,770 | 11/1957 | Scholfield | 312—268 |
| 2,816,000 | 12/1957 | Scholfield | 312—268 |
| 2,846,634 | 7/1958 | Bauer | 318—467 |
| 2,928,705 | 3/1960 | Goldsmith | 312—223 |
| 3,141,123 | 7/1964 | Olson | 318—467 |

FOREIGN PATENTS

| | | |
|---|---|---|
| 523,159 | 3/1956 | Canada. |
| 913,847 | 12/1962 | Great Britain. |

CLAUDE A. LE ROY, *Primary Examiner.*

CHANCELLOR E. HARRIS, *Examiner.*